United States Patent
Kuchibhotla et al.

(10) Patent No.: US 7,414,989 B2
(45) Date of Patent: Aug. 19, 2008

(54) ACK/NACK DETERMINATION RELIABILITY FOR A COMMUNICATION DEVICE

(75) Inventors: Ravi Kuchibhotla, Gurnee, IL (US); Robert T. Love, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 897 days.

(21) Appl. No.: 10/431,560

(22) Filed: May 7, 2003

(65) Prior Publication Data
US 2004/0223507 A1 Nov. 11, 2004

(51) Int. Cl.
*H04Q 7/00* (2006.01)
(52) U.S. Cl. .................. 370/329; 370/336; 370/341; 370/342; 455/70
(58) Field of Classification Search ............... 370/205, 370/329, 331, 912, 252, 311, 42; 455/95, 455/442, 435, 450
See application file for complete search history.

(56) References Cited

U.S. PATENT DOCUMENTS

| | | | |
|---|---|---|---|
| 6,507,582 B1 | 1/2003 | Abrol | |
| 6,678,523 B1 | 1/2004 | Ghosh | |
| 6,807,428 B2 * | 10/2004 | Casaccia | 455/515 |
| 6,993,341 B2 * | 1/2006 | Hunzinger | 455/450 |
| 7,120,134 B2 * | 10/2006 | Tiedemann, Jr. et al. | 370/329 |
| 2002/0080179 A1 | 6/2002 | Parkfall et al. | |
| 2002/0154610 A1 * | 10/2002 | Tiedemann et al. | 370/329 |
| 2002/0168945 A1 | 11/2002 | Hwang et al. | |
| 2003/0035440 A1 * | 2/2003 | Casaccia et al. | 370/473 |
| 2003/0072280 A1 | 4/2003 | McFarland et al. | |
| 2004/0141460 A1 * | 7/2004 | Holtzman et al. | 370/216 |

FOREIGN PATENT DOCUMENTS

| | | |
|---|---|---|
| EP | 1271832 A1 | 1/2003 |
| GB | 2206020 A | 12/1988 |

OTHER PUBLICATIONS

"3rd Generation Partnership Project; Technical Specification Group Radio Access Network; Physical Channels and Mapping of Transport Channels onto Physical Channels (FDD)" 3GPP TS 25.211; v5.3.0; Dec. 2002.

Lucent Technologies, UL Overhead Reduction by Using DL Activity Dependent CQI Reporting, 3GPP TSG RAN WG#28 R1-02-1069, Aug. 19-22, 2002, Seattle, WA, USA.

(Continued)

*Primary Examiner*—Seema S. Rao
*Assistant Examiner*—Wanda Z Russell
(74) *Attorney, Agent, or Firm*—Sylvia Chen; Brian M. Mancini

(57) ABSTRACT

A method for ACK/NACK determination reliability for a communication device includes a first step of defining a supplementary indicator of message acceptability. A next step includes sending data from a communication device to a BTS on an uplink channel. A next step includes checking the data to see if it was properly received. A next step includes providing the supplementary indicator of message acceptability to the communication device in addition to ACK/NACK information. A next step includes utilizing the supplementary indicator of message acceptability to determine a reliability of the ACK/NACK information.

9 Claims, 9 Drawing Sheets

OTHER PUBLICATIONS

Lucent, Variable Rate Channel Quality Indication, 3GPP TSG RAN WG1 Meeting #27 Tdoc R1-02-0935, TS 25.214 CR 276 current version 5.1.0, Jul. 2-5, 2002, Oulu, Finland.

Siemens, CQI Reporting Enhancement, 3GPP TSG-RAN Working Group 1#28 Tdoc R1-02-1046, Aug. 19-22, 2002, Seattle, WA, USA.

Philips, Averaging of CQI Measurements for Mixed UE Velocities, 3GPP TSG RAN WG1#30 Tdoc R1-030127, Jan. 7-10, 2003, San Diego, USA.

Siemens, Improvement of HSDPA Throughput and Resource Consumption Using Fast CQI Messages, 3GPP TSG RAN Working Group 1 #30 Tdoc R1-030006, Jan. 7-10, 2003, San Diego, CA, USA.

* cited by examiner

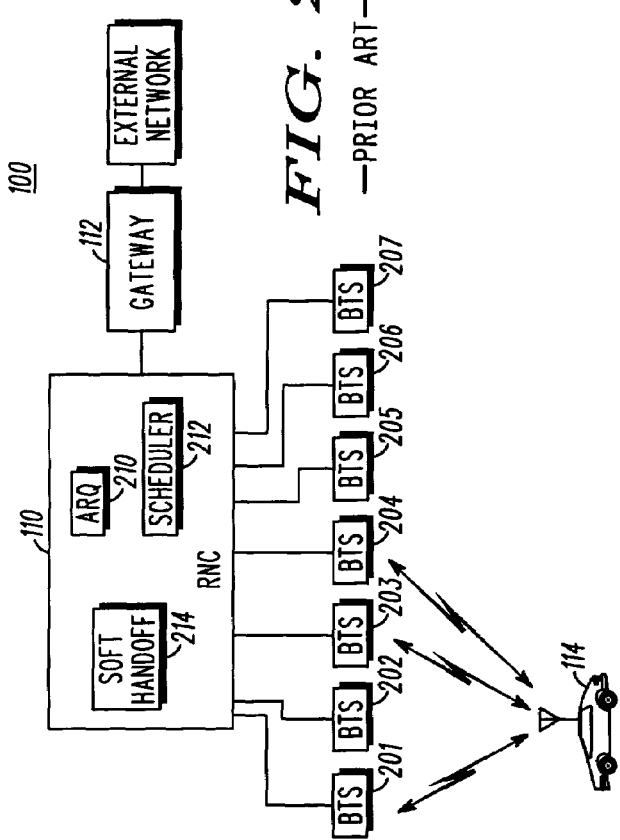
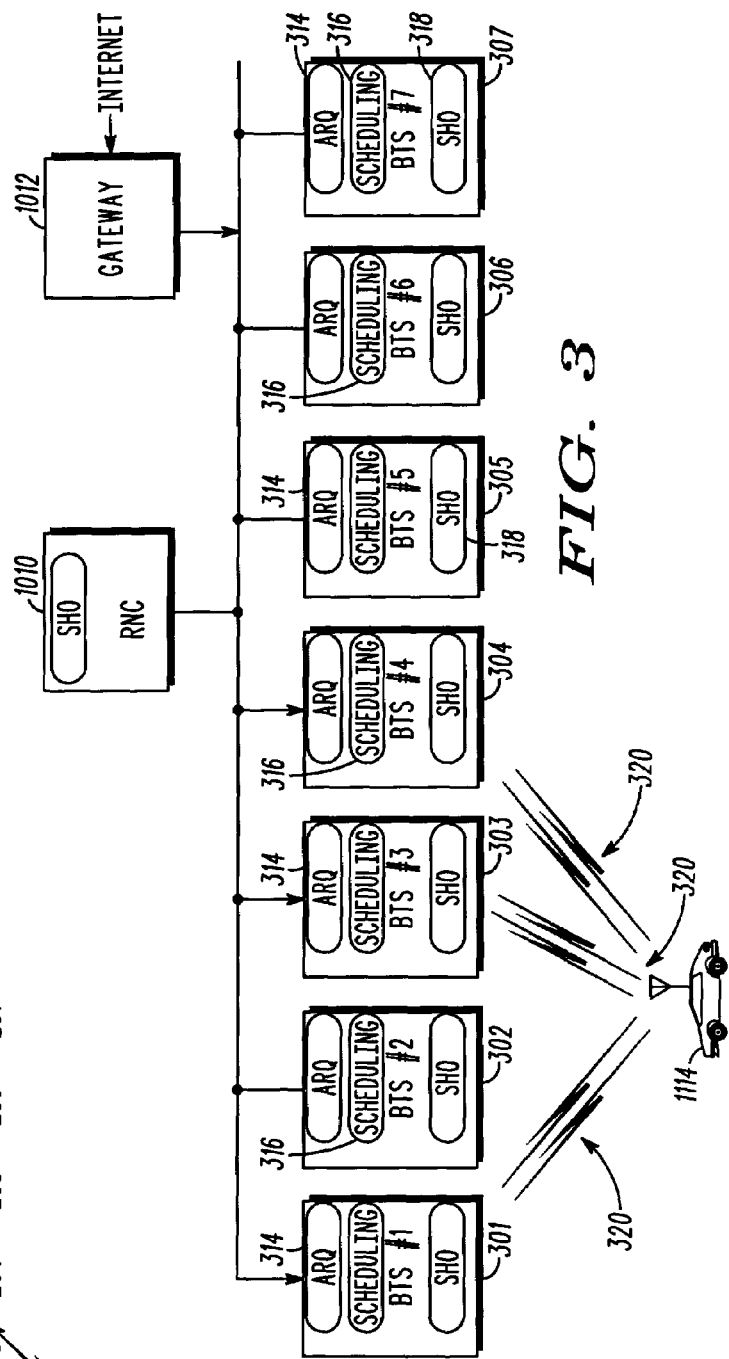

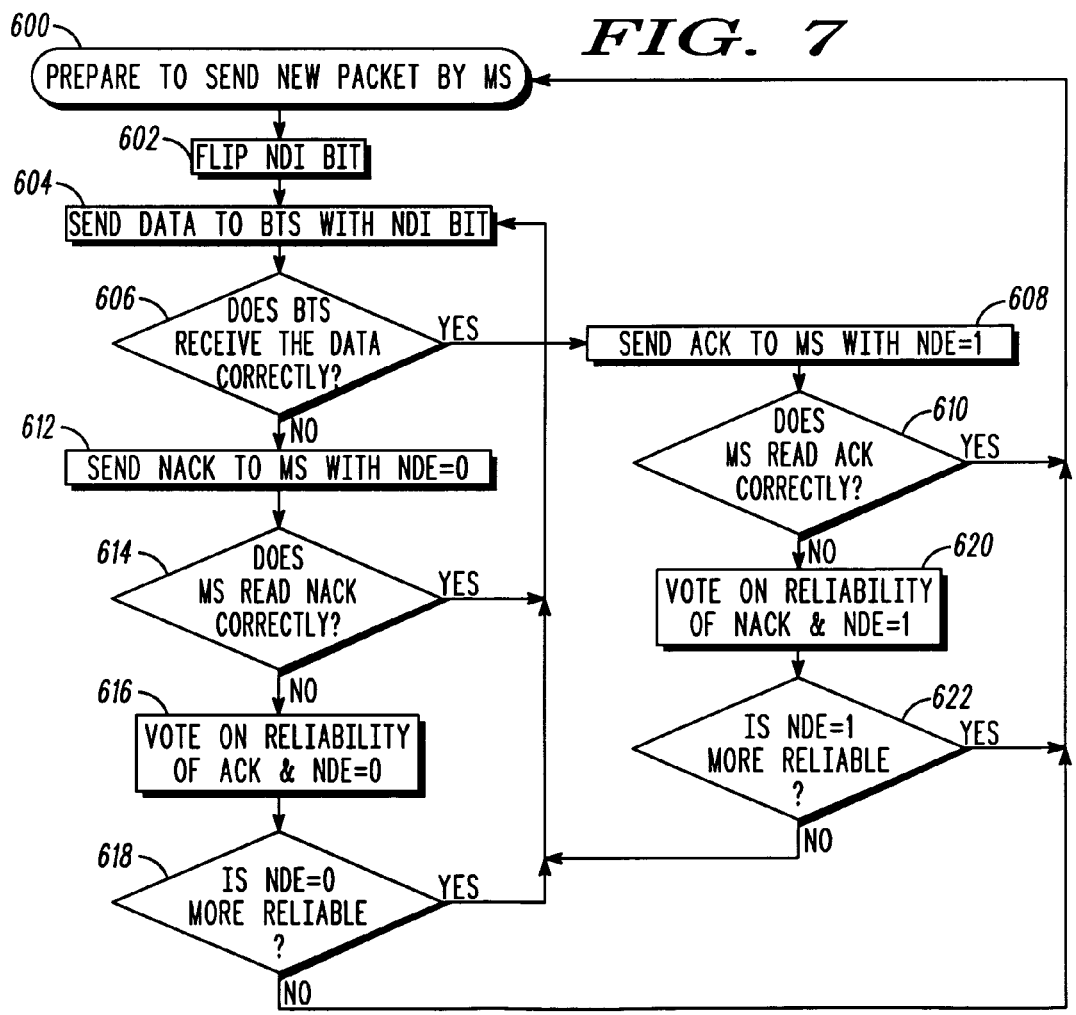

| NDI (MS TFRI) | ACK/NACK SENT (BTS) | ACK/NACK RECEIVED (MS), $t$ | NDE $t+t_0$ |
|---|---|---|---|
| 0 (PREVIOUS PACKET) | ACK | ACK | 1 |
| 1 (1st ATTEMPT) | NACK | NACK | 1 |
| 1 (2nd ATTEMPT) | ACK | NACK | 0 |
| 1 (3rd ATTEMPT) | ACK (2nd) | ACK | 1 |

*FIG. 8*

| NDI (MS TFRI) | ACK/NACK SENT (BTS) | ACK/NACK RECEIVED (MS) |
|---|---|---|
| 0 (PREVIOUS PACKET) | ACK | ACK |
| 1 (1st ATTEMPT) | NACK | NACK |
| 1 (2nd ATTEMPT) | NACK | ACK |
| 0 (1st ATTEMPT) | ERROR: FLUSH | |

*FIG. 9*
— PRIOR ART —

| NDI (MS TFRI) | ACK/NACK SENT (BTS) | ACK/NACK RECEIVED (MS) | NDE SENT (BTS) |
|---|---|---|---|
| 0 (PREVIOUS PACKET) | ACK | ACK | 0 |
| 1 (1st ATTEMPT) | NACK | NACK | 1 |
| 1 (2nd ATTEMPT) | NACK | ACK | 0 |
| 1 (3rd ATTEMPT) | ~~ERROR: FLUSH~~ ACK | ACK | 0 |

*FIG. 10*

| NDI (MS TFRI) (3bits) | ACK/NACK SENT (BTS1) | ACK/NACK SENT (BTS2) | ACK/NACK RECEIVED 1 (MS) | ACK/NACK RECEIVED 2 (MS) | NDE SENT (BTS1) |
|---|---|---|---|---|---|
| 0 (PREVIOUS PACKET) | ACK | NACK | ACK | NACK | 0 |
| 1 (1st ATTEMPT) | NACK | NACK | NACK | NACK | 1 |
| 1 (2nd ATTEMPT) | NACK | ACK (FLUSH) | ACK (ERROR) | ACK (?) | 0 |
| 1 (3rd ATTEMPT) | ACK | DTX OR ACK | ACK | DTX OR ACK | 0 |

*FIG. 11*

ACK/NACK DETERMINATION RELIABILITY FOR A COMMUNICATION DEVICE

FIELD OF THE INVENTION

The present invention relates generally to a wireless communication device, and more specifically to reliability in receiving message acknowledgements.

BACKGROUND OF THE INVENTION

In a Universal Mobile Telecommunications System (UMTS), such as that proposed for the next of the third generation partnership project (3GPP2) standards for the UMTS Terrestrial Radio Access Network (UTRAN), such as wideband code division multiple access (WCDMA) or cdma2000 for example, user equipment (UE) such as a mobile station (MS) communicates with any one or more of a plurality of base station subsystems (BSSs) dispersed in a geographic region. The mobile station is typically a cellular communication device. Each BSS continuously transmits a downlink physical control (pilot) channel signal having the same spreading code but with a different code phase offset. Phase offset allows the pilot signals to be distinguished from one another, which in turn allows the base stations to be distinguished. Hereinafter, a pilot signal of a BSS will be simply referred to as a pilot. The MS monitors the pilots and measures the received energy of the pilots.

In the WCDMA system, there are a number of states and channels for communications between the MS and the BSS. For example, in the Mobile Station Control on the Traffic State, the BSS communicates with the MS over a Forward Traffic Channel in a forward link and the MS communicates with the BSS over a Reverse Traffic Channel in a reverse link. During a call, the MS must constantly monitor and maintain four sets of pilots. The four sets of pilots are collectively referred to as the Pilot Set and include an Active Set, a Candidate Set, a Neighbor Set, and a Remaining Set.

The Active Set includes pilots associated with the Forward Traffic Channel assigned to the MS. This set is active in that the pilots associated with this set are all within soft handoff range of the MS. The Candidate Set includes pilots that are not currently in the Active Set but have been received by the MS with sufficient strength to indicate that an associated Forward Traffic Channel could be successfully demodulated. The Neighbor Set includes pilots that are not currently in the Active Set or Candidate Set but are likely candidates for handoff. The Remaining Set includes all possible pilots in the current system on the current WCDMA frequency assignment, excluding the pilots in the Neighbor Set, the Candidate Set, and the Active Set.

Typically, a BSS services a coverage area that is divided up into multiple sectors. In turn, each sector is serviced by one or more of multiple base transceiver stations (BTSs) included in the BSS. When the MS is serviced by a first BTS, the MS constantly searches pilot channels of neighboring BTSs for a pilot that is sufficiently stronger than a threshold value. The MS signals this event to the first, serving BTS using a Pilot Strength Measurement Message. As the MS moves from a first sector serviced by a first BTS to a second sector serviced by a second BTS, the communication system promotes certain pilots from the Candidate Set to the Active Set and from the Neighbor Set to the Candidate Set. The serving BTS notifies the MS of the promotions via a Handoff Direction Message. Afterwards, for the MS to commence communication with a new BTS that has been added to the Active Set before terminating communications with an old BTS, a "soft handoff" will occur.

For the reverse link, typically each BTS in the Active Set independently demodulates and decodes each frame or packet received from the MS. It is then up to a switching center or selection distribution unit (SDU) normally located in a Base Station Site Controller (BSC), which is also known as a Radio Network Controller (RNC) using WCDMA terminology, to arbitrate between the each BTS's decoded frames. Such soft handoff operation has multiple advantages. Qualitatively, this feature improves and renders more reliable handoff between BTSs as a user moves from one sector to the adjacent one. Quantitatively soft-handoff improves the capacity/coverage in a WCDMA system. However, with the increasing amount of demand for data transfer (bandwidth), problems can arise.

Several third generation standards have emerged, which attempt to accommodate the anticipated demands for increasing data rates. At least some of these standards support synchronous communications between the system elements, while at least some of the other standards support asynchronous communications. At least one example of a standard that supports synchronous communications includes cdma2000. At least one example of a standard that supports asynchronous communications includes WCDMA.

While systems supporting synchronous communications can sometimes allow for reduced search times for handover searching and improved availability and reduced time for position location calculations, systems supporting synchronous communications generally require that the base stations be time synchronized. One such common method employed for synchronizing base stations includes the use of global positioning system (GPS) receivers, which are co-located with the base stations that rely upon line of sight transmissions between the base station and one or more satellites located in orbit around the earth. However, because line of sight transmissions are not always possible for base stations that might be located within buildings or tunnels, or base stations that may be located under the ground, sometimes the time synchronization of the base stations is not always readily accommodated.

However, asynchronous transmissions are not without their own set of concerns. For example, the timing of uplink transmissions in an environment supporting autonomous scheduling by the individual subscribers can be quite sporadic and/or random in nature. While traffic volume is low, the autonomous scheduling of uplink transmissions is less of a concern, because the likelihood of a collision (i.e. overlap) of data from data being simultaneously transmitted by multiple subscribers is lower. Furthermore, in the event of a collision, there is spare bandwidth available to accommodate the need for any retransmissions. However, as traffic volume increases, the likelihood of data collisions (overlap) also increases. The need for any retransmissions also correspondingly increases, and the availability of spare bandwidth to support the increased amount of retransmissions correspondingly diminishes. Consequently, the introduction of explicit scheduling by a scheduling controller can be beneficial.

However even with explicit scheduling, given the disparity of start and stop times of asynchronous communications and more particularly the disparity in start and stop times relative to the start and stop times of different uplink transmission segments for each of the non-synchronized base stations, gaps and overlaps can still occur. Gaps correspond to periods of time where no subscriber is transmitting. Overlaps correspond to periods of time where multiple subscribers are transmitting simultaneously. Both gaps and overlaps represent inefficiencies in the usage of the available bandwidth and the management of accurate communication.

For example, FIG. 1 is a block diagram of communication system 100 of the prior art. Communication system 100 can be a cdma2000 or a WCDMA system. Communication system 100 includes multiple cells (seven shown), wherein each cell is divided into three sectors (a, b, and c). A BSS 101-107 located in each cell provides communications service to each mobile station located in that cell. Each BSS 101-107 includes multiple BTSs, which BTSs wirelessly interface with the mobile stations located in the sectors of the cell serviced by the BSS. Communication system 100 further includes a radio network controller (RNC) 110 coupled to each BSS and a gateway 112 coupled to the RNC. Gateway 112 provides an interface for communication system 100 with an external network such as a Public Switched Telephone Network (PSTN) or the Internet.

The quality of a communication link between an MS, such as MS 114, and the BSS servicing the MS, such as BSS 101, typically varies over time and movement by the MS. As a result, as the communication link between MS 114 and BSS 101 degrades, communication system 100 provides a soft handoff (SHO) procedure by which MS 114 can be handed off from a first communication link whose quality has degraded to another, higher quality communication link. For example, as depicted in FIG. 1, MS 114, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-b, 3-c, and 4-a, are known in the art as the Active Set of the MS. The communication system 100 also provides a message acknowledgment/no acknowledgement (ACK/NACK) procedure by which an active BTS can notify the MS 114 that their last message was not received properly and requires a retransmission or other suitable action.

Referring now to FIG. 2, a communication procedure performed by communication system 100 is illustrated. FIG. 2 is a block diagram of a hierarchical structure of communication system 100. As depicted in FIG. 2, RNC 110 includes an ARQ function 210, a scheduler 212, and a soft handoff (SHO) function 214. FIG. 2 further depicts multiple BTSs 201-207, wherein each BTS provides a wireless interface between a corresponding BSS 101-107 and the MSs located in a sector serviced by the BSS.

When performing a soft handoff, each BTS 201, 203, 204 in the Active Set of the MS 114 receives a transmission from MS 114 over a reverse link of a respective communication channel 221, 223, 224. The Active Set BTSs 201, 203, and 204 are determined by SHO function 214. Upon receiving the transmission from MS 114, each Active Set BTS 201, 203, 204 demodulates and decodes the contents of a received radio frame along with related frame quality information.

At this point, each Active Set BTS 201, 203, 204 then conveys the demodulated and decoded radio frame to RNC 110, along with related frame quality information. RNC 110 receives the demodulated and decoded radio frames along with related frame quality information from each BTS 201, 203, 204 in the Active Set and selects a best frame based on frame quality information. Scheduler 212 and ARQ function 210 of RNC 110 then generate control channel information that is distributed as identical pre-formatted radio frames to each BTS 201, 203, 204 in the Active Set. Alternatively, the BTS of the current cell where the MS is camped (BTS 202) can include its own scheduler and bypass the RNC 110 when providing scheduling information to the MS. The Active Set BTSs 201, 203, 204 then simulcast the pre-formatted radio frames over the forward link. The control channel information is then used by MS 114 to determine what transmission rate to use. Further, the ARQ function is associated with an ACK/NACK channel for use by the BTS to communicate whether the previous message from the MS was received properly by the BTS.

The scheduling function allows a mobile station (MS) to signal control information corresponding to an enhanced reverse link transmission to Active Set base transceiver stations (BTSs) and by allowing the BTSs to perform control functions. The MS in a SHO region can choose a scheduling assignment corresponding to a best transport format and transport-related information (TFRI) out of multiple scheduling assignments that the MS receives from multiple active set BTS. As a result, the uplink channel can be scheduled during SHO, without any explicit communication between the BTSs. In either case, data rate constraints are provided by a scheduler, which is used by the MS 114, along with control channel information, to determine what transmission rate to use.

As proposed for the UMTS system, a MS can use an enhanced uplink dedicated transport channel (EUDCH) to achieve an increased data rate coverage of a reverse link. The MS must determine the data rate to use for the enhanced uplink based on local measurements at the MS and information provided by the UTRAN rate constraints. Moreover, to achieve higher throughput on the reverse link, communication systems such as communication system 100 have adapted techniques such as Hybrid Automatic Repeat ReQuest (H-ARQ) that involves retransmission of erroneous information and Adaptive Modulation and Coding (AMC), as are known in the art.

Adaptive Modulation and Coding (AMC) provides the flexibility to match the modulation and forward error correction (FEC) coding scheme to the average channel conditions for each user, or MS, serviced by the communication system. AMC promises a large increase in average data rate for users that have a favorable channel quality due to their proximity to a BTS or other geographical advantage. Enhanced GSM systems using AMC offer data rates as high as 384 kbps compared to 100 kbps without AMC. Likewise, 5 MHz CDMA systems can offer downlink and uplink peak data rates as high as 10 Mbps and 2 Mbps respectively through AMC, where 2 Mbps and 384 kbps was typical without AMC.

AMC has several drawbacks. AMC is sensitive to measurement error and delay. In order to select the appropriate modulation, the scheduler, such as scheduler 212, must be aware of the channel quality. Errors in the channel estimate will cause the scheduler to select the wrong data rate and either transmit at too high a power, wasting system capacity, or too low a power, raising the block error rate. Delay in reporting channel measurements also reduces the reliability of the channel quality estimate due to constantly varying mobile channel. To overcome measurement delay, a frequency of the channel measurement reports may be increased. However, an increase in measurement reports consumes system capacity that otherwise might be used to carry data.

Hybrid ARQ is an implicit link adaptation technique. Whereas, in AMC explicit C/I measurements or similar measurements are used to set the modulation and coding format, in H-ARQ, link layer acknowledgements are used for retransmission decisions. Many techniques have been developed for implementing H-ARQ, such as Chase combining, Rate compatible Punctured Turbo codes, and Incremental Redundancy. Incremental Redundancy, or H-ARQ-type-II, is an implementation of the H-ARQ technique wherein instead of sending simple repeats of the entire coded packet, additional redundant information is incrementally transmitted if the decoding fails on the first attempt.

H-ARQ-type-III also belongs to the class of Incremental Redundancy ARQ schemes. However, with H-ARQ-type-III, each retransmission is self-decodable, which is not the case with H-ARQ-type II. Chase combining (also called H-ARQ-type-III with one redundancy version) involves the retransmission by the transmitter of the same coded data packet. The decoder at the receiver combines these multiple copies of the transmitted packet weighted by the received SNR. Diversity (time) gain as well as coding gain (for IR only) is thus obtained after each re-transmission. In H-ARQ-type-III with multiple redundancy, different puncture bits are used in each retransmission. The details for how to implement the various H-ARQ schemes are commonly known in the art and therefore are not discussed herein.

H-ARQ combined with AMC can greatly increase user throughputs, potentially doubling/trebling system capacity. In effect, Hybrid ARQ adapts to the channel by sending additional increments of redundancy, which increases the coding rate and effectively lowers the data rate to match the channel. Hybrid ARQ does not rely only on channel estimates but also relies on the errors signaled by the ARQ protocol.

In the enhanced uplink dedicated channel, the mobile is scheduled by the scheduler, or the mobile can be transmitting in autonomous mode. The BTS sends an ACK/NACK indication to the mobile in response to a message. An ACK (acknowledged) indication acknowledges that the message was properly received. A NACK (not acknowledged) indication indicates that the message was not properly received and should be resent by the MS to the BTS. Optionally, a lack of response from a BTS can be interpreted by the MS as a NACK.

A number of error cases can arise that will degrade the maximum attainable throughput, since an error will generally require a retransmission of the same data. Moreover, the error case of a NACK sent by the BTS being considered an ACK by the mobile can lead to disastrous conditions. In this case, the mobile would have flushed from it's buffer the data packets as soon as an ACK is perceived and this data is lost forever in the case of streaming applications. However, even in non-streaming applications, this type of error would negatively impact system throughput since Receiver-Driven Layered Multicast Congestion Control (RLC) retransmission would be triggered, or in the worst case Transport Control Protocol (TCP) slow start would be triggered, both of which seriously affect data throughput. Additionally, when receiving another scheduling assignment message on the downlink from the BTS, the mobile would now send a different uplink data transmission with contents different from the prior transmission and the BTS would then erroneously soft-combine this in an ARQ operation with information in it's soft buffer that corresponds to previous data, thus affecting the success of transmission of this new packet as well. Solving this problem is therefore important to ensure a high throughput of good data in the uplink. In another error case, the BTS can sent an ACK that the mobile determines to be a NACK, wherein the MS may needlessly retransmit the same data that has already been successfully received at the BTS. This also reduces overall system throughput.

Therefore, a need exists for a new technique to enhance the reliability of the determination of ACK/NACK information, thereby resolving the issues of erroneous determination of an ACK as a NACK and NACK as an ACK, both with and without soft handoff (SHO). In particular, it would be of benefit to set up a technique to allow the feedback of information between the MS and active set BTSs such that a macro selection diversity benefit is obtained.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 2 is a block diagram of a hierarchical structure of the communication system of FIG. 1;

FIG. 3 depicts a distributed network architecture in accordance with an embodiment of the present invention;

FIG. 6 is a graph of a prior art ACK to NACK interpretation;

FIG. 7 is a flow chart of the operation of FIG. 8;

FIG. 8 is a graph of an ACK to NACK interpretation, in accordance with the present invention;

FIG. 9 is a graph of a prior art NACK to ACK interpretation;

FIG. 10 is a graph of an NACK to ACK interpretation, in accordance with the present invention;

FIG. 11 is a graph of a soft handoff NACK to ACK interpretation, in accordance with the present invention;

DETAILED DESCRIPTION OF THE INVENTION

Figure 1:
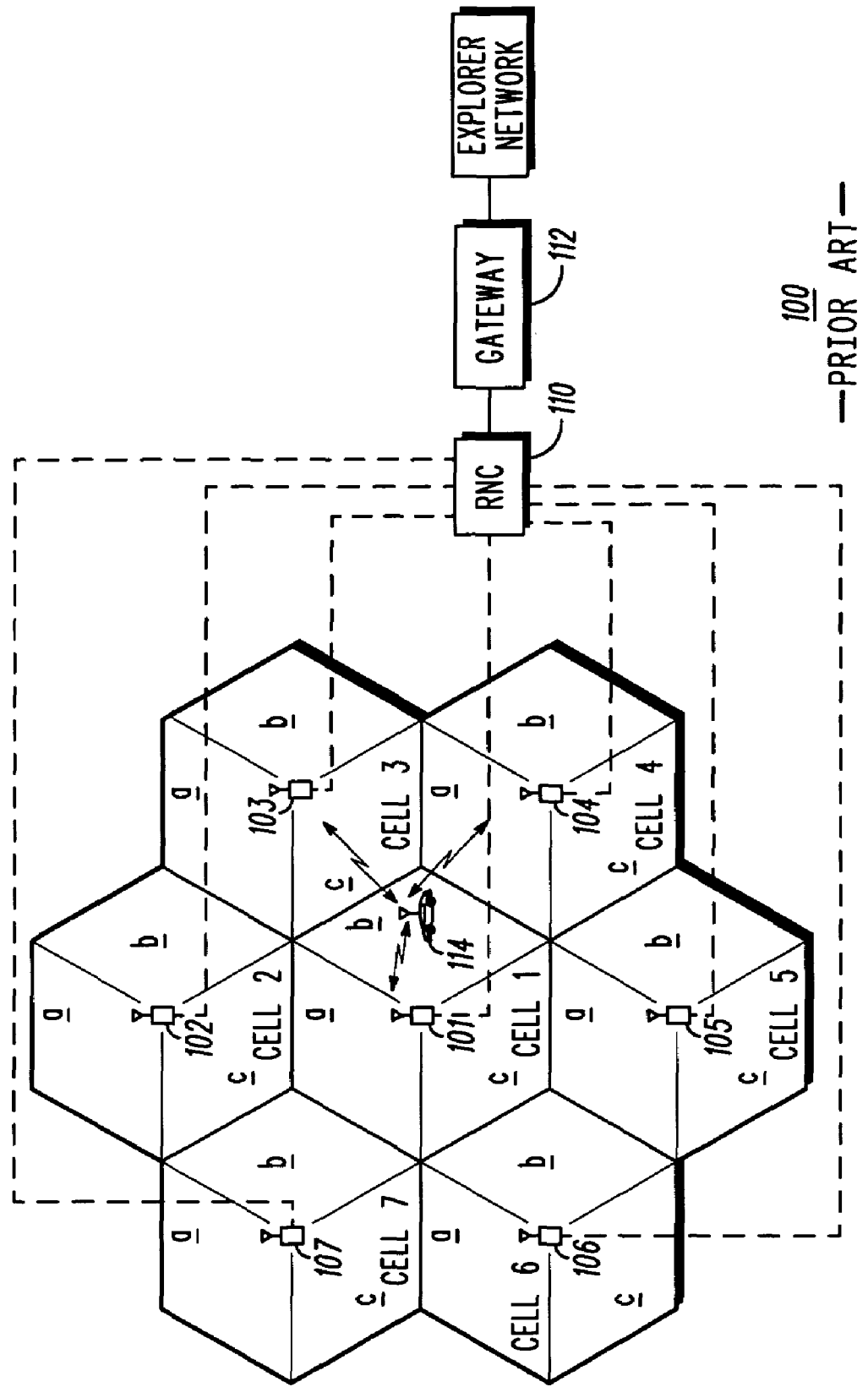
FIG. 1 is a block diagram of an exemplary communication system of the prior art.

The present invention provides a method to enhance the reliability of the determination of ACK/NACK information, thereby resolving the issues of erroneous determination of an ACK as a NACK and NACK as an ACK both in and without soft handoff (SHO). This is achieved through a novel technique of using channel quality and "new data expected" indicators in a scheduling assignment message from a BTS to a communication device (MS). This technique allows the set up of feedback information between the MS and active set BTSs such that a macro selection diversity benefit is obtained.

In general, the present invention supports active set handoff and scheduling functions by allowing a mobile station (MS) to provide HARQ ACK/NACK coding information to improve data throughput of an enhanced reverse link transmission to Active Set base transceiver stations (BTSs). The present invention allows more efficient implementation of an enhanced reverse link channel with adaptive modulation and coding (AMC), Hybrid ARQ (HARQ), and fast scheduling with reduced ARQ delay. HARQ, AMC, active set handoff, and scheduling functions are preferably supported in a distributed fashion by allowing a mobile station (MS) to signal control information corresponding to an enhanced reverse link transmission to Active Set base transceiver stations (BTSs) and by allowing the BTSs to perform control functions. Time and signal-to-noise ratio (SNR)-based HARQ flush functions are supported at the BTSs during soft handoff (SHO), and provides an efficient control channel structure to support scheduling, HARQ, AMC functions for an enhanced reverse link, or uplink, channel in order to maximize throughput, and enables an MS in a SHO region to choose a scheduling assignment corresponding to a best transport format and resource-related information (TFRI) out of multiple scheduling assignments that the MS receives from multiple active set BTS. As a result, the enhanced uplink channel can be scheduled during SHO, while supporting HARQ and AMC, without any explicit communication between the BTSs.

The present invention may be more fully described with reference to FIGS. 3-5. FIG. 5 is a block diagram of a communication system 1000 in accordance with an embodiment of the present invention. Preferably, communication system 1000 is a Code Division Multiple Access (CDMA) communication system, such as cdma2000 or Wideband CDMA (WCDMA) communication system, that includes multiple communication channels. Those who are of ordinary skill in the art realize that communication system 1000 may operate in accordance with any one of a variety of wireless communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

Similar to communication system 100, communication system 1000 includes multiple cells (seven shown). Each cell is divided into multiple sectors (three shown for each cell—sectors a, b, and c). A base station subsystem (BSS) 1001-1007 located in each cell provides communications service to each mobile station located in that cell. Each BSS 1001-1007 includes multiple base stations, also referred to herein as base transceiver stations (BTSs) or Node-Bs, which wirelessly interface with the mobile stations located in the sectors of the cell serviced by the BSS. Communication system 1000 further includes a radio network controller (RNC) 1010 coupled to each BSS, preferably through a 3GPP TSG UTRAN Iub Interface, and a gateway 1012 coupled to the RNC. Gateway 1012 provides an interface for communication system 1000 with an external network such as a Public Switched Telephone Network (PSTN) or the Internet.

Referring now to FIGS. 3 and 5, communication system 1000 further includes at least one mobile station (MS) 1014. MS 1014 may be any type of wireless user equipment (UE), such as a cellular telephone, a portable telephone, a radiotelephone, or a wireless modem associated with data terminal equipment (DTE) such as a personal computer (PC) or a laptop computer. MS 1014 is serviced by multiple BTSs, that are included in an Active Set associated with the MS. MS 1014 wirelessly communicates with each BTS in communication system 1000 via an air interface that includes a forward link (from the BTS to the MS) and a reverse link (from the MS to the BTS). Each forward link includes multiple forward link control channels including an ACK/NACK channel, a paging channel, and traffic channel. Each reverse link includes multiple reverse link control channels, a paging channel, and a traffic channel. However, unlike communication system 100 of the prior art, each reverse link of communication system 1000 further includes another traffic channel, an Enhanced Uplink Dedicated Transport Channel (EUDCH), that facilitates high speed data transport by permitting a transmission of data that can be dynamically modulated and coded, and demodulated and decoded, on a sub-frame by sub-frame basis.

Figure 4:
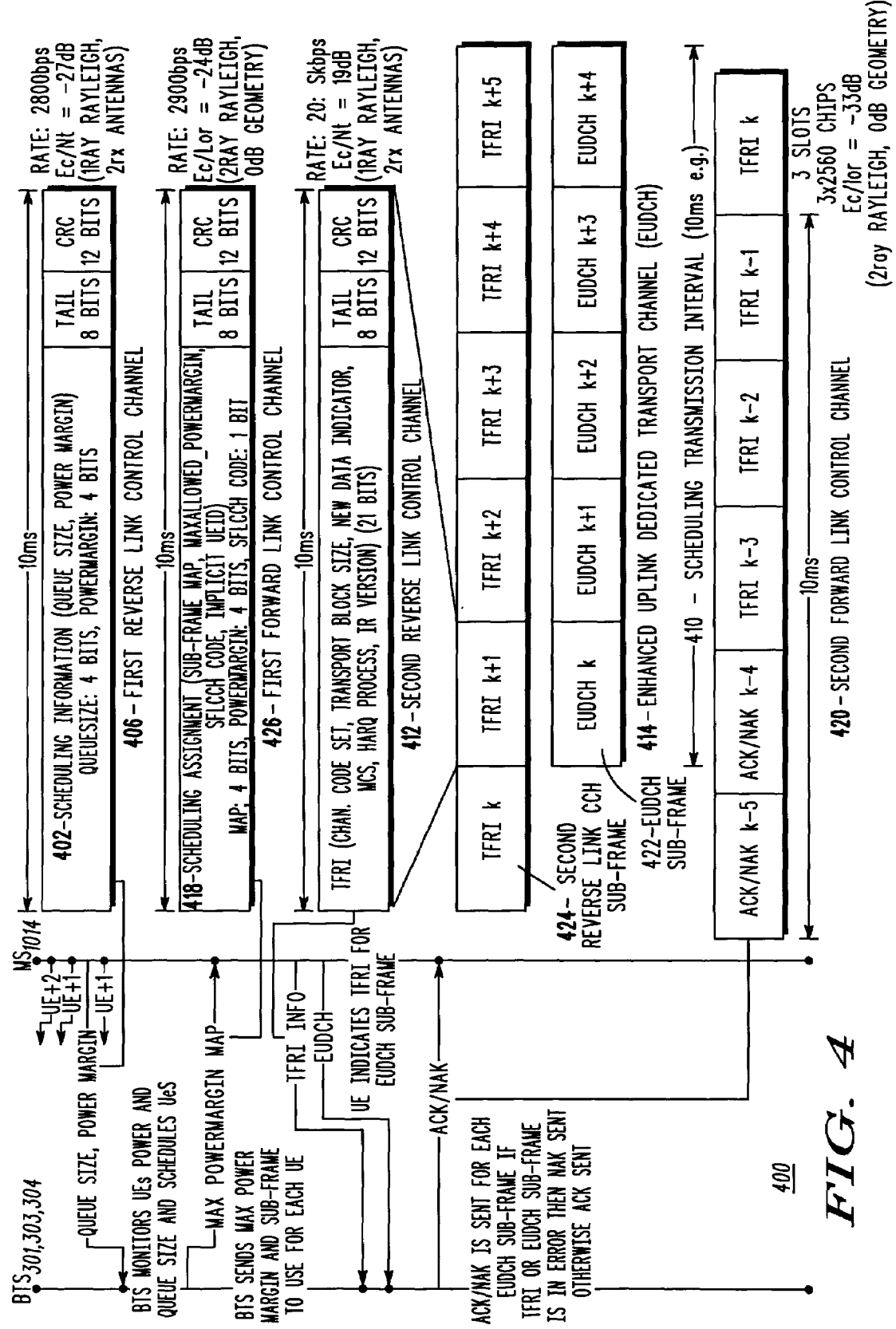
FIG. 4 is a message flow diagram in accordance with an embodiment of the present invention.
Figure 5:
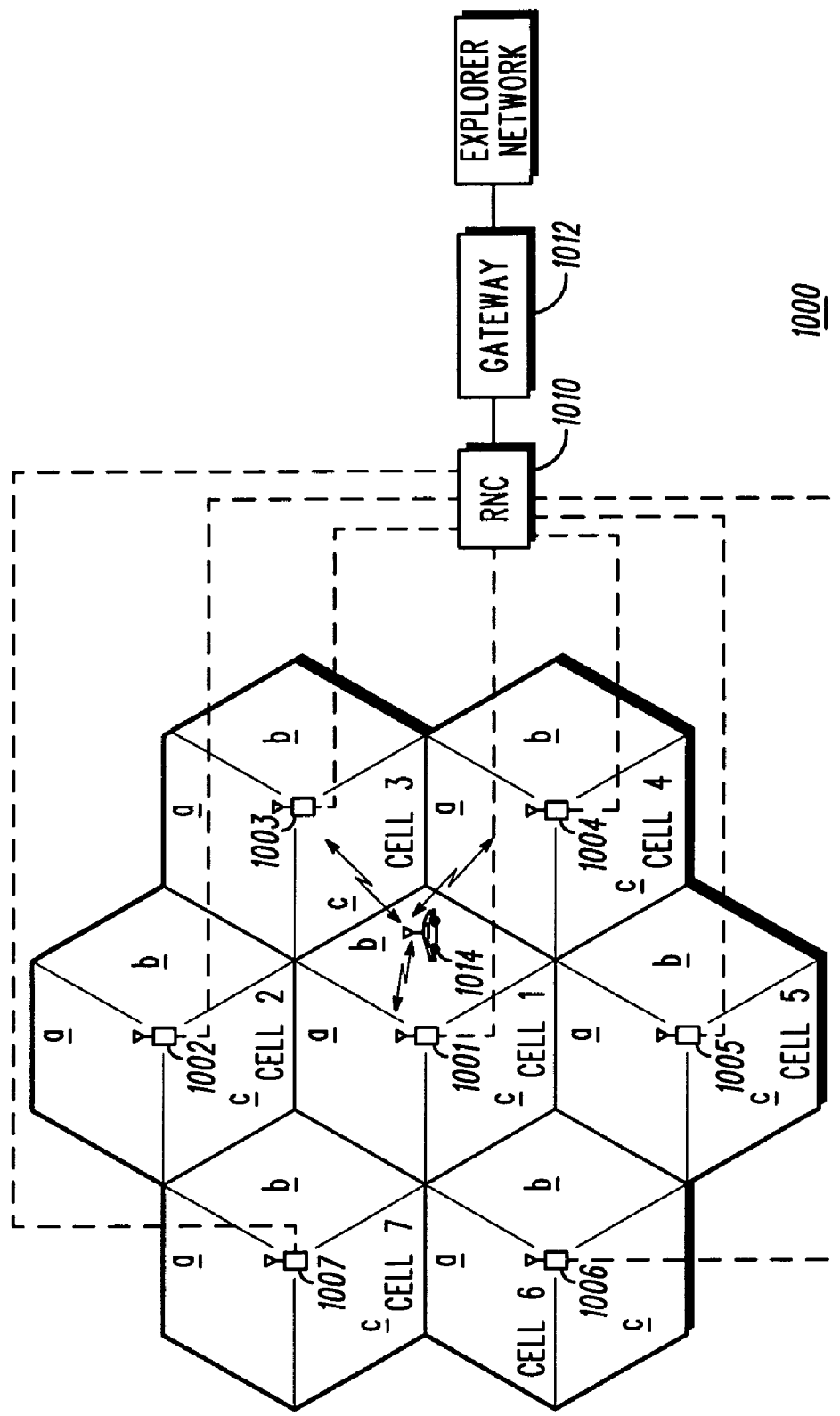
FIG. 5 is a block diagram of an exemplary communication system, in accordance with the present invention.

In operation, FIG. 4 shows a message flow diagram 400 illustrates an exchange of communications between an MS of communication system 1000, such as MS 1014, and each of the multiple BTSs included in an Active Set of the MS, that is, BTSs 301, 303, and 304. MS 1014 communicates scheduling information 402 to each Active Set BTS 301, 303, 304 using a first reverse link control channel 406 with a known fixed modulation and coding rate and transport block size. A corresponding code assignment for the first reverse link control channel is done on a semi-static basis. Preferably, MS 1014 does not transmit control information when the MS's corresponding data queue is empty.

Each Active Set BTS 301, 303, 304 receives scheduling information 402 from the MS 1014 serviced by the BTS via the first reverse link control channel 406. The scheduling information 402 may include the data queue status and the power status of the MS. Based on the scheduling information 402 received from each MS serviced by a BTS, each serving, or Active Set, BTS 301, 303, 304 schedules one or more of the MSs serviced by the BTS, that is, MS 1014, for each scheduling transmission interval 410.

Each Active Set BTS 301, 303, 304 uses reverse link interference level, MS scheduling information 402, and power control information to determine a maximum allowed power margin target or limit for each MS 1014 serviced by the BTS. Power margin is the difference between a current DPCCH power level and the maximum power level supported by the MS. The pilot is a reverse link channel that is used for demodulation purposes such as automatic frequency control, synchronization, and power control. For example, in a WCDMA system this channel is referred to as a DPCCH. A maximum EUDCH to DPCCH power ratio target can also be determined.

Upon choosing an MS (e.g. MS 1014) to be scheduled, each Active Set BTS 301, 303, 304 conveys a scheduling assignment 418 to the chosen MS, such as MS 1014, on a first forward link control channel 426. The first forward link control channel 426 can use the 10 ms frame format depicted in FIG. 4, which format includes a scheduling assignment 418, tail bits, and a CRC. Alternatively, the first forward link control channel 426 frame size may use a frame format of 2 ms. The first forward link control channel 426 is staggered to avoid additional latency. The scheduling assignment 418 consists of the maximum allowed 'power margin' limit or target and a map of the allowed EUDCH sub-frame transmission intervals, such as a 2 ms sub-frame interval, for the next 10 ms transmission interval using a first forward link control channel 426.

Referring back to FIG. 5, communication system 1000 includes a soft handoff (SHO) procedure by which MS 1014 can be handed off from a first air interface whose quality has degraded to another, higher quality air interface. For example, as depicted in FIG. 5, MS 1014, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-b, 3-c, and 4-a, are the Active Set of the MS. In other words, MS 1014 is in soft handoff (SHO) with the BTSs 301, 303, and 304, associated with the sectors 1-b, 3-c, and 4-a servicing the MS, which BTSs are the Active Set of the MS. As used herein, the terms 'Active Set' and 'serving,' such as an Active Set BTS and a serving BTS, are interchangeable and both refer to a BTS that is in an Active Set of an associated MS. Furthermore, although FIGS. 3 and 5 depict BTSs 301, 303, and 304 as servicing only a single MS, those who are of ordinary skill in the art realize that each BTS 301-307 may concurrently schedule, and service, multiple MSs, that is, each BTS 301-307 may concurrently be a member of multiple Active Sets.

FIG. 3 depicts a network architecture 300 of communication system 1000 in accordance with an embodiment of the present invention. As depicted in FIG. 3, communication system includes multiple BTSs 301-307, wherein each BTS provides a wireless interface between a corresponding BSS 1001-1007 and the MSs located in a sector serviced by the BTS. Preferably, a scheduling function 316, an ARQ function 314 and a SHO function 318 are distributed in each of the BTSs 301-307. RNC 1010 is responsible for managing mobility by defining the members of the Active Set of each MS serviced by communication system 1000, such as MS 1014, and for coordinating multicast/multireceive groups. For each MS in communication system 1000, Internet Protocol (IP) packets are multi-cast directly to each BTS in the Active Set of the MS, that is, to BTSs 301, 303, 304 in the Active Set of MS 1014.

Preferably, each BTS 301-307 of communication system 1000 includes a SHO function 318 that performs at least a portion of the SHO functions. For example, SHO function 318 of each BTS 301, 303, 304 in the Active Set of the MS 1014 performs SHO functions such as frame selection and signaling of a new data indicator. Each BTS 301-307 can include a scheduler, or scheduling function, 316 that alternatively can reside in the RNC 110. With BTS scheduling, each Active Set BTS, such as BTSs 301, 303, and 304 with respect to MS 1014, can choose to schedule the associated MS 1014 without need for communication to other Active Set BTSs based on scheduling information signaled by the MS to the BTS and local interference and SNR information measured at the BTS. By distributing scheduling functions 306 to the BTSs 301-307, there is no need for Active Set handoffs of a EUDCH in communication system 1000. The ARQ function 314 and AMC function, which functionality also resides in RNC 110 of communication system 100, can also be distributed in BTSs 301-307 in communication system 1000. As a result, when a data block transmitted on a specific Hybrid ARQ channel has successfully been decoded by an Active Set BTS, the BTS acknowledges the successful decoding by conveying an ACK to the source MS (e.g. MS 1014) without waiting to be instructed to send the ACK by the RNC 1010.

In order to allow each Active Set BTS 301, 303, 304 to decode each EUDCH frame, MS 1014 conveys to each Active Set BTS, in association with the EUDCH frame, modulation and coding information, incremental redundancy version information, HARQ status information, and transport block size information from MS 1014, which information is collectively referred to as transport format and resource-related information (TFRI). The TFRI only defines rate and modulation coding information and H-ARQ status. The MS 1014 codes the TFRI and sends the TFRI over the same frame interval as the EUDCH.

For example, as is known in the art, during reverse link communications, the MS 1114 transmits frames to a plurality of BTSs 301, 303, 304. The structure of the frames, includes: (a) a flush bit which indicates to the BTS when to combine a current frame with a previously stored frame or to flush the current buffer; (b) data; (c) a cyclic redundancy check (CRC) bit which indicates whether a frame decoded successfully or not (i.e., whether the frame contained any errors); and (d) a tail bit for flushing the channel decoder memory. The information contained in the frame is referred to herein as soft information. The BTSs can combine frames from multiple re-transmissions using an H-ARQ scheme. The MS 1114 can also transmit supplemental reliability bits, as will be explained below.

After receiving a frame from the MS 1114, the BTSs 301, 303, 304 will process the frame and communicate to the MS 1114 over a forward control channel whether the frame contained any errors (ACK/NACK). At the present time, if all BTSs communicate that the frame contains errors, the MS 1114 will retransmit the same frame to all BTSs, with the F bit set to instruct the BTSs to combine the retransmitted frame with the original stored frame. If only one or none of the BTSs communicates that the frame contains errors, the MS 1114 will transmit the next frame to all the BTSs with the F bit set to instruct all BTSs to erase the previous frame from memory and not to combine the previous frame with the current frame. This wastes resources. In addition, the MS cannot address individual non-scheduling BTSs, but only the scheduling BTS, because the MS does not know which code channel to listen to from the other non-scheduling active set BTSs. Further, the mobile may misinterpret a NACK indication from the BTS as an ACK, or vice versa. These problems are solved in the present invention.

In particular, the present invention encompasses a method for ACK/NACK determination reliability for a communication device. Specifically, the present invention provides a supplementary indicator of message acceptability that is used in conjunction with the ACK/NACK information. In a first embodiment, the supplementary indicator is a New Data Expected (NDE) indicator that is sent in a subsequent scheduling assignment message (SAM) from the BTS. In this embodiment, following the reception of ACK/NACK information on the ACK/NACK channel, the MS does not flush data in its buffer until a NDE is received in a subsequent SAM. By coupling the both the ACK/NACK information and the NDE indicator, the mobile is able to make a more reliable conclusion regarding the success of the previous transmission.

In a second embodiment of the invention, operational in soft handoff, the MS uses the downlink pilot signal level from each active set BTS for the supplementary indicator of message acceptability. The downlink pilot signal level can be used to infer the downlink channel quality, wherein if the quality is good it is more likely that a received ACK message is correct. Alternatively, the MS can use the downlink Transmit Power Control (TPC) command information (sent on the uplink to active set BTSs) to determine the reliability of the ACK/NACK channel for a particular BTS. For example, if a MS receives a NACK from a scheduling BTS and a ACK from a non-scheduling BTS, the MS could base its final determination on the above mentioned information.

Preferably, when sending data in the uplink corresponding to a new packet after determining that a previous transmission was successful, the MS can set a New Data Indicator (NDI) bit(s) in the transport format related information, TFRI (rate information sent on control channel to assist in decoding data sent on uplink data channel), so that the BTS that sent a NACK for the previous transmission does not erroneously soft combine the data bits of the new packet with the soft decision bits corresponding to the previous packet. Note that even if a single BTS (not in SHO) has sent the indication (and no energy was detected on the ACK/NACK channel of other BTSs thus implying a NACK), the mobile could base its decision of ACK/NACK on the channel quality of the downlink. In SHO, the above techniques can be used in combination to provide increased reliability of the ACK/NACK channel in combination with the "new data indicator" bit(s) sent by the mobile in the uplink on the TFRI channel.

Efficient layer 1 signaling is needed to enable fast explicit and autonomous scheduling with Hybrid ARQ at the BTS for enhanced uplink. To enable uplink Hybrid ARQ an acknowledged/not acknowledged (ACK/NACK) feedback code channel can be used. The MS is told by a scheduling BTS which downlink code channel it should listen to for receiving ACK/NACK information. Alternatively, the ACK/NACK information can be coded in the SAM from the BTS to the MS. In the explicit mode, the BTSs in the active set sends dedicated scheduling assignment messages (SAM) to each mobile that describes a data transmission opportunity on the enhanced uplink channel. The scheduling assignment can be sent over a 10 ms or a 2 ms long frame. Although other frame lengths are certainly possible, 10 ms and 2 ms frame lengths are more common in 3GPP. In the case of a 10 ms scheduling assignment message, there is sufficient room for additional bits to provide indication of ACK/NACK of previously received transmissions. In addition CRC protection can be used to provide sufficient reliability of the ACK/NACK information. However, the 10 ms SAM message suffers from not being able to rely on the latest radio conditions due to its length. The latter is not critical though since the MS can be required to use the power control information in addition to the power margin information in the SAM message to determine the uplink rate. This could still lead to reduced throughput in case the scheduled MS's radio conditions improved and the BTS did not schedule enough number of MSs in Code Division Multiplex (CDM), whereby two or more users are simultaneously assigned transmission opportunities within the same time period, to utilize the left-over noise rise margin. Also note that the 10 ms case suffers from the additional disadvantage of potentially low overall throughput in the case where the SAM message is lost and therefore the resource is wasted due to loss of a complete 10 ms worth of transmission opportunity.

When a 2 ms frame length is used for the SAM message, the BTS is able to react quickly to changing radio conditions at the mobile and schedule it on an up-fade. In this case, it is useful to use a separate ACK/NACK channel to provide an indication to the mobile on the success or lack thereof of the mobile's uplink data transmission due to insufficient number of available bits on the downlink scheduling assignment channel over 2 ms. Due to the lack of CRC information of the ACK/NACK information itself (ACK/NACK in this case being merely a detection of pilot energy by the mobile) there is potential for erroneous determination of ACK/NACK by the mobile. However, CRC protection can still be provided in a 2 ms SAM by piggy backing ACK/NACK information on the 2 ms SAM message (which itself has a CRC) with a two bit ACK/NACK field.

There are a number of benefits to sending the ACK/NACK on a separate code channel. Coherent BPSK is very reliable given a 2 ms interval. Use repetition to avoid need for CRC in SHO. In other words, repetition of SAM cannot be used. But by using repetition of the ACK/NACK, it can be ensured that the mobile receives the information with minimal error. There is anti-correlation between SAM and ACK/NACK usage for asynchronous HARQ since typically non-contiguous frame scheduling is expected. In other words, one does not want to send a larger SAM message if all that is needed is to send a simple ACK/NACK indication. In particular, the user may not be scheduled again and not receive a subsequent SAM. Similarly, the built-in overhead of combined SAM and ACK/NACK is especially significant for non-scheduling BTSs. For example, non-scheduling BTSs that only want to send an ACK/NACK indication presently need to send a SAM message, even if not scheduling, if ACK/NACK is combined with the SAM. In addition, there would be a need for more ACK/NACK bits per HARQ channel if ACK/NACK is piggy backed on the SAM.

Additionally in SHO, multiple BTS's may receive the uplink data and send a ACK/NACK indication. The BTS may or may not send a scheduling assignment message following this to the mobile. In this case it is useful to have a mechanism that assists the mobile to determine which BTS's ACK/NACK channel it should base its decision of ACK/NACK on. In this case, if the scheduling BTS has sent a NACK but the mobile receives an ACK from another non-scheduling BTS the mobile could make an erroneous determination.

The present invention requires that the mobile not flush its buffer immediately on receiving the ACK/NACK indication from the BTS. The present invention further adds a one bit "new data expected" indicator to the scheduling assignment message sent on another code channel and the mobile is required to read this to determine if the BTS (that sent it the previous SAM message) is expecting new information or a retransmission of the previous transmission. If the mobile receives a "new data expected" indicator in the scheduling assignment message it can reliably determine that the BTS has in fact successfully received the previous packet and it can then flush this packet from its buffer. The "new data expected" indicator is included in the scheduling assignment message and therefore has CRC protection, and hence the potential for falsing is low. In addition, it should be noted that the memory requirement on the mobile is not increased due to having to store the (packet) transmission (it is not stored as soft bits) until reading of the scheduling assignment message. Note that this mechanism is also useful in the case where the mobile receives an ACK from the BTS and interprets it as a NACK (a more probable erroneous condition).

Another embodiment of the invention, operational in SHO, requires the mobile to use the downlink pilot signal level (e.g. downlink channel quality) from each active set BTS or equivalently the downlink TPC command information (sent on the uplink to active set BTSs) to determine the reliability of the ACK/NACK channel for a particular BTS. In case the mobile receives a NACK from the scheduling BTS and an ACK from a non-scheduling BTS, the mobile could base its final determination on the above mentioned information. When sending data in the uplink corresponding to a new packet after determining that the previous transmission was successful, the mobile would set the "new data indicator" bit(s) in the TFRI (rate information sent on control channel to assist in decoding data sent on uplink data channel) so that BTSs that sent a NACK for the previous transmission do not erroneously soft combine the data bits of the new packet with the soft decision bits corresponding to the previous packet. Note that even if a single BTS has sent the indication (and no energy was detected on the ACK/NACK channel of other BTSs thus implying a NACK), the mobile could base its decision of ACK/NACK on the channel quality of the downlink.

In SHO, the above mechanisms in combination would provide increased reliability of the ACK/NACK channel in combination with the "new data indicator" bit(s) sent by the mobile in the uplink on the TFRI channel.

In a preferred embodiment, if the mobile makes a final determination of a NACK, then it would await a further SAM message and after a time T1 (if a SAM was not already received and therefore no "new data expected" indicator was received), and either flush the data (concluding that it's determination was incorrect) or, if no SAM message was received for a time T2 (could be equal to T1), revert to an autonomous mode and send the packet again. Note the lack of receipt of the SAM message could also serve as an indication that the BTS did successfully receive the packet and be used as input in the determination process (if for time T1 no SAM was received). Timers T1 and T2 could be network determined timers based on the service that is mapped to this channel and the quality of service expected. If before the expiry of T1 the mobile does not receive a SAM message from the same BTS but receives a SAM message from another BTS, the mobile can simply choose a different HARQ channel identity to send another packet, and at the expiry of T1 continue its actions for the previous packet as above. Therefore, there is no stall in data transfer.

Note that the NDE (new data expected indicator) is not the same as sending the ACK/NACK bit twice, i.e. once on the ACK/NACK channel and again later on the SAM channel where it is called the NDE bit. This relieves non-scheduling BTSs from having to send the SAM channel if only the NDE (truly the ACK/NACK bit in this case) is sent and not both a ACK/NACK and NDE. That is, if the non-scheduling BTS did not send the SAM with the NDE and did not send the ACK/NACK then there would be no macro-selection diversity benefit possible. Also there are significant benefits for having a separate ACK/NACK and SAM channel as discussed earlier which are independent of whether a NDE exists or not. There are additional reliability benefits by having both a NDE and an ACK/NACK which have also been discussed above.

The present invention corresponds to uplink data transmission where a delayed flush technique is used to provide additional reliability for the ACK/NACK indication. Also a new technique for determining ACK/NACK in the case of SHO (or even in the case of a single BTS providing indication) is provided. This technique can also be used in HSDPA at the BTS by utilizing the uplink channel quality information to determine the reliability of the ACK/NACK indication sent by the mobile.

The present invention includes several novel aspects, some of which are listed as follows. Firstly, the present invention requires the mobile to not flush its buffer immediately on reading the ACK/NACK channel. Secondly, the present invention provides a "new data expected" indicator in the downlink scheduling assignment message to provide additional reliability for the ACK/NACK indication. Thirdly, the present invention can utilize the downlink channel quality (pilot bits, power control command information) to make a determination of the ACK/NACK indication. Fourthly, the present invention includes the use of timers to determine actions if no SAM is subsequently received.

FIGS. 6-13 are charts demonstrating the operation of the present invention as compared to the prior art. In each case, distributed scheduling of users on data channels requires reliable ACK/NACK determination to ensure maximum throughput. Reading errors, such as reading an ACK as a NACK, and reading NACK as an ACK cause substantial negative impacts. The impact for reading NACK as an ACK is significant since it can result in either data being permanently lost or incurring transport delay due to upper layer transport protocol retransmissions. Also wasted transmissions occur when an ACK is read as NACK, which reduces throughput. In the examples below, the "new data indicator" (NDI) bit corresponds to the F (flush) bit previous described. The NDI bit has a flip function wherein NDI changes state (from 0 to 1 or from 1 to 0) for each successfully transmitted and received packet from the MS to the BTS.

Referring to FIG. 6, a present situation is shown where a BTS sends an ACK (acknowledge) indicating the data from the MS was properly received. However, the MS misreads this as a NACK. In this example, in the first row, an MS has transmitted a previous packet (here with NDI=0), which the BTS has successfully received and sent an ACK on the ACK/NACK channel to the MS. The MS properly receives the ACK indication which completes the transmission of the previous packet. The MS then prepares to send a new packet. As shown in the second row, the NDI bit is state flipped (from 0 to 1 in this example) and the data is sent to the BTS with the NDI bit. The flip of the NDI bit indicates to the BTS that this is new data. In this case, the data is not received by the BTS properly, which indicates this as a NACK. The MS also receives the NACK properly and prepares to retransmit the data. Therefore, in the third row, the NDI bit is not flipped (i.e. it remains 1 indicating to the BTS that the same data is being sent). In this case, the BTS properly receives that data and indicates this with an ACK. However, the MS has an error and misreads the ACK as a NACK. Thereafter, in the fourth row, the NDI bit is not flipped (i.e. it remains 1 indicating to the BTS that the same data is being sent), and the data is resent until an ACK is properly sent and received. This waste resources and throughput as the BTS has already received the data properly.

The present invention solves this problem by incorporating a "new data expected" (NDE) indicator sent by the BTS to the MS. The NDE correlates to the ACK signal from the BTS, as explained in FIGS. 7 and 8, but is delayed (shown by the diagonal arrow) due to its being in a SAM from the BTS. The SAM is delayed a time t from the ACK/NACK channel. The MS now retains the previous packet in its buffer until the SAM is received-and proper reception of the data by the BTS can be determined. In this example, once again in the first row, an MS has transmitted a previous packet, which the BTS has successfully received and sent an ACK on the ACK/NACK channel to the MS. In addition, in this case the BTS also sends an NDE of 1, which is a supplemental indication that the data was properly received. Although the MS properly receives the ACK indication, the MS also receives an NDE indicator of 1, which indicates that the BTS is now expecting new data (i.e. the previous packet was received properly). This completes the transmission of the previous packet. The MS then prepares 600 to send a new packet of data. As shown in the second row, the NDI bit is state flipped 602 (from 0 to 1 in this example) and the data is sent 604 to the BTS with the NDI bit. The flip of the NDI bit indicates to the BTS that this is new data. In this case, the data is not received by the BTS properly 606, which indicates this 612 as a NACK and sends an NDE of 0, indicating that the data was not received properly and that new data is not expected (i.e. the previous, old data is expected to be retransmitted). In this row, the MS also reads 614 the NACK properly along with the later transmitted (in the SAM) NDE which confirms the NACK. If the ACK/NACK and NDE disagreed, a voting procedure 616 would be used, as will be explained below. In this case there is agreement between the NACK and NDE=0, so the MS will retransmit the data 604. Therefore, in the third row, the NDI bit is not flipped (i.e. it remains 1 indicating to the BTS that the same data is being sent). In this case, the BTS properly receives 606 the retransmitted data and indicates this with an ACK 608 and the sending of and NDE of 1. However, the MS has an error and misreads 610 the ACK as a NACK, but correctly receives the NDE. The MS must then vote 620 on the reliability of the misread NACK or the NDE=1. Since the NDE is sent in a SAM that has a CRC check and the ACK/NACK channel does not have a CRC check, the MS determines that the NDE=1 is more reliable 622, ignoring the misread NACK and preparing to send a new packet 600. Thereafter, in the fourth row, the NDI bit is flipped 602, and new data is sent 604 with the new NDI bit, which is properly received by the BTS 606 and MS 610. Therefore, the present invention provides a solution to the wasted resources and throughput that can presently occur when a MS misreads a BTS ACK as a NACK. The discussion can now turn to the instance where a MS misreads a BTS NACK as an ACK, which is a more serious condition since data can be lost.

Referring to FIG. 9, a present situation is shown where a BTS sends a NACK (not acknowledged) indicating the data from the MS was not properly received. However, the MS misreads this as an ACK. In this example, in the first row, an MS has transmitted a previous packet (here with NDI=0), which the BTS has successfully received and sent an ACK on the ACK/NACK channel to the MS. The MS properly receives the ACK indication which completes the transmission of the previous packet. The MS then prepares to send a new packet. As shown in the second row, the NDI bit is state flipped (from 0 to 1 in this example) and the data is sent to the BTS with the NDI bit. The flip of the NDI bit indicates to the BTS that this is new data. In this case, the data is not received by the BTS properly, which indicates this as a NACK. The MS also receives the NACK properly and prepares to retransmit the data. Therefore, in the third row, the NDI bit is not flipped (i.e. it remains 1 indicating to the BTS that the same data is being sent). In this case, the BTS still does not properly receive that data and indicates this with an NACK. However, the MS has an error and misreads the NACK as an ACK. This has serious consequences as the MS flushes its buffer thinking that the BTS has properly received that data. Thereafter, in the fourth row, the NDI bit is flipped since new data is loaded into the buffer and the new data is sent. This also has serious consequences since the flipped NDI bit tells the BTS to flush any soft data that it had that might have been useful in recovering the original message. This data is permanently lost, not to mention the wasted resources, throughput and the increased delay die to TCP/RLC retransmissions.

The present invention also solves this problem by incorporating the "new data expected" (NDE) indicator sent by the BTS to the MS, as explained in FIGS. 7 and 10, but is delayed (shown by the diagonal arrow) due to its being in a SAM from the BTS. The SAM is delayed a time t from the ACK/NACK channel. As before, the MS retains the previous packet in its buffer until the SAM is received and proper reception of the data by the BTS can be determined. In this example, once again in the first row, an MS has transmitted a previous packet, which the BTS has successfully received and sent an ACK on the ACK/NACK channel to the MS. In addition, in this case the BTS also sends an NDE of 1, which is the supplemental indication that the data was properly received. Although the MS properly receives the ACK indication, the MS also receives an NDE indicator of 1, which indicates that the BTS is now expecting new data (i.e. the previous packet was received properly). This completes the transmission of the previous packet. The MS then prepares 600 to send a new packet of data. As shown in the second row, the NDI bit is state flipped 602 (from 0 to 1 in this example) and the data is sent 604 to the BTS with the NDI bit. The flip of the NDI bit indicates to the BTS that this is new data. In this case, the data is not received by the BTS properly 606, which indicates this 612 as a NACK and sends an NDE of 0, indicating that the data was not received properly and that new data is not expected (i.e. the previous, old data is expected to be retransmitted). In this row, the MS also reads 614 the NACK properly along with the later transmitted (in the SAM) NDE which confirms the NACK. If the ACK/NACK and NDE disagreed, a voting procedure 616 would be used, as will be explained below. In this case there is agreement between the NACK and NDE=0, so the MS will retransmit the data 604. Therefore, in the third row, the NDI bit is not flipped (i.e. it remains 1 indicating to the BTS that the same data is being sent). In this case, the BTS still does not properly receive 606 the retransmitted data and indicates this with a NACK 612 and the sending of and NDE of 0. However, the MS has an error and misreads 614 the NACK as an ACK, but correctly receives the NDE. The MS must then vote 616 on the reliability of the misread ACK or the NDE=0. Since the NDE is sent in a SAM that has a CRC check and the ACK/NACK channel does not have a CRC check, the MS determines that the NDE=0 is more reliable 618, ignoring the misread ACK and preparing to send the old packet 604. Thereafter, in the fourth row, the NDI bit is not flipped, and old data is sent 604 with the same NDI bit, which is now properly received by the BTS 606 and MS 610. Therefore, the present invention provides a solution to the wasted resources and throughput and lost data that can presently occur when a MS misreads a BTS NACK as an ACK. The discussion can now turn to the instance where a MS is on soft handoff and in communication with more than one BTS.

Figure 12:
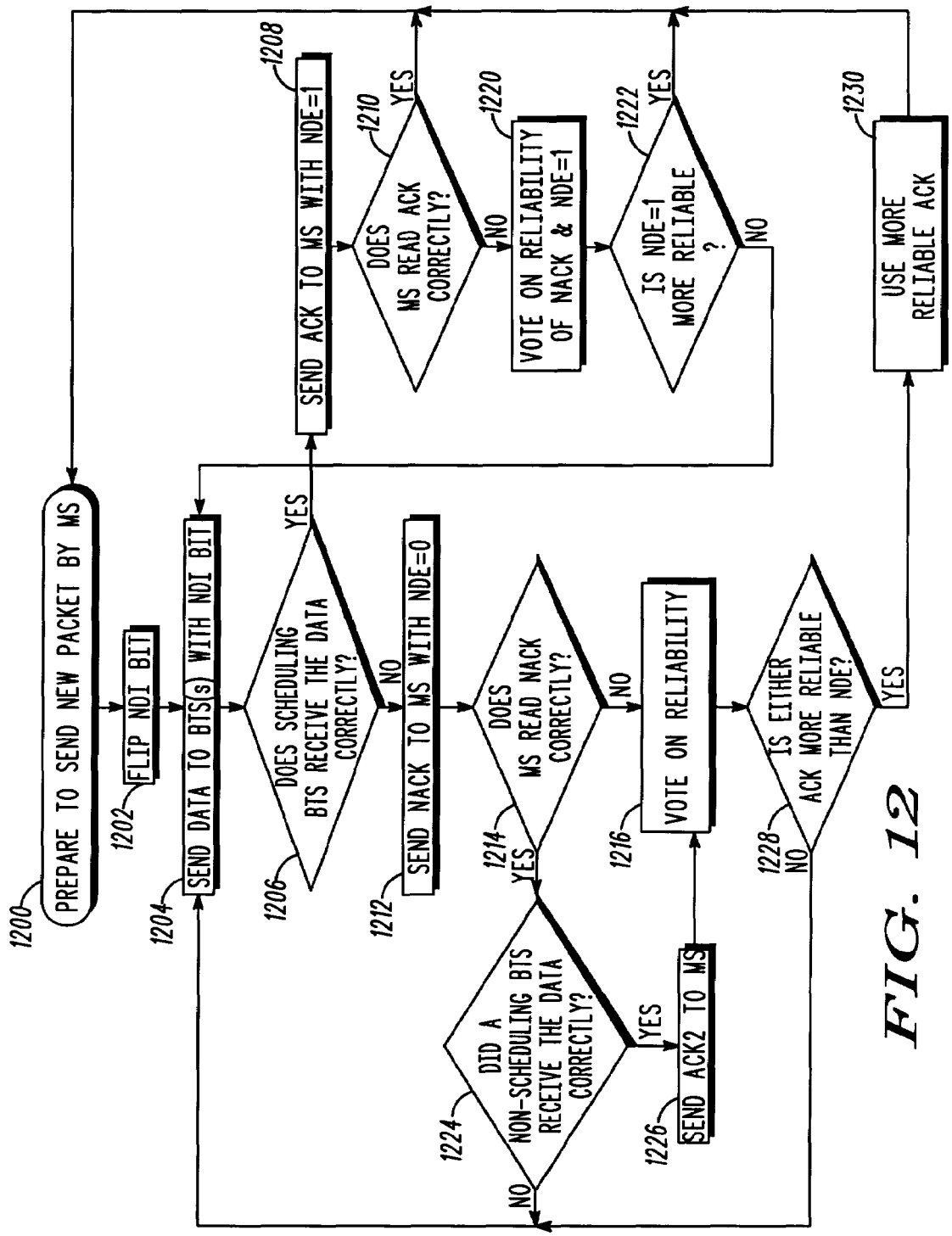
FIG. 12 is a flow chart of the operation of FIG. 11.

Referring to FIGS. 11 and 12, a present situation is shown where an MS is in soft handoff with a scheduling BTS and one or more non-scheduling BTSs in its active set. In this instance, a separate ACK/NACK code is used for the non-scheduling BTS(s), i.e. the non-scheduling BTS sends no SAM. This example is meant to show a scheduling BTS that sends a NACK (not acknowledged) indicating the data from the MS was not properly received, and the MS misreads this as an ACK. Further, a non-scheduling BTSI can send a conflicting ACK/NACK indication to the MS, which is also addressed in the present invention. In the first row, an MS has transmitted 1204 a previous packet (here with NDI=0), which the scheduling BTS has successfully received and sent 1208 an ACK on the ACK/NACK channel to the MS. The scheduling BTS also sends and "new data expected" indication (NDE=1) in a SAM to the MS. The MS properly receives 1210 the ACK indication and confirming NDE. Therefore, the MS does not need to determine the reliability 1220, 1221 in this case. Since the MS has confirming evidence of a properly received packet by the scheduling BTS, even where a non-scheduling BTS sends a NACK, the MS accepts the evidence as a valid transmission, which completes the transmission of the previous packet so the MS can flush the previous packet. In other words, an MS will ignore non-scheduling BTS(s) as long as there is proper communication with a scheduling BTS. Since the first row show a properly received packet, the MS then prepares to send a new packet 1200. As shown in the second row, the NDI bit is state flipped 1202 (from 0 to 1 in this example) and the data is sent 1204 to the BTS(s) with the NDI bit. The flip of the NDI bit indicates to the BTS(s) that this is new data. In this case, the data is not received by the scheduling BTS properly 1206, which indicates this 1212 as a NACK and sends an NDE of 0, indicating that the data was not received properly and that new data is not expected (i.e. the previous, old data is expected to be retransmitted). However, in contrast to the previous row, the present invention must consider whether any non-scheduling BTS(s) may have properly received 1224 the packet. Therefore, even if the MS reads the NACK correctly 1214 and has confirming evidence (NDE=0) of a misread packet by the scheduling BTS, the MS will check if a non-scheduling BTS sent 1226 an ACK. However, in this second row the non-scheduling BTS also misread 1224 the packet which confirms that no active set BTS has given an indication of properly receiving the packet. Therefore, the MS will retransmit the previous packet. Therefore, in the third row, the NDI bit is not flipped (i.e. it remains 1 indicating to the BTS that the same data is being sent), and the packet is resent 1204. In this case, the BTS still does not properly receive 1206 the retransmitted data and indicates this with a NACK 1212 and the sending of and NDE of 0. However, the MS has an error and misreads 1214 the NACK as an ACK, but correctly receives the NDE=0. The MS will then vote 1216 on the reliability. Since the NDE is sent in a SAM that has a CRC check and the ACK/NACK channel does not have a CRC check, the MS determines that the NDE=0 is more reliable than the ACK, and would normally resend the packet. However, there is another parameter here to consider, in accordance with the present invention, as a non-scheduling BTS may have sent an ACK (ACK2). If NDE=0 (ACK) and there is an ACK2, the MS can determine 1228 if the scheduling BTS (NDE=0) or non-scheduling BTS (ACK2) is more reliable.

Figure 13:
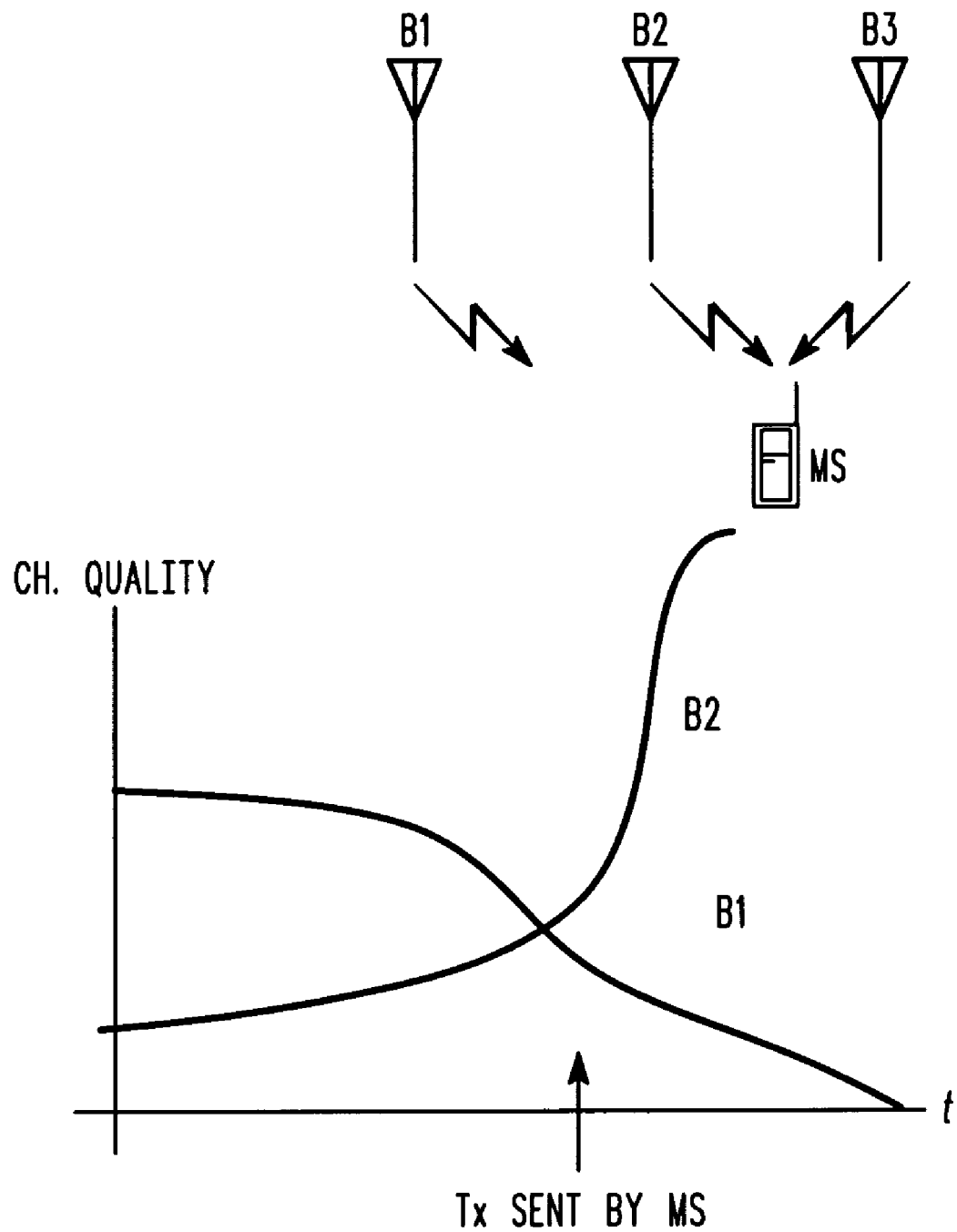
FIG. 13 is a chart for reliability interpretation, in accordance with the present invention.

Referring to FIG. 13, reliability between BTSs can be determined through several means. For example, if the channel quality (e.g. signal-to-interference ratio) has improved for the non-scheduling BTS (B2) while the channel quality has degraded for the scheduling BTS (B1), then the ACK from B2 can indicate that it would be appropriate for the MS to switch 1230 to B2 as the scheduling BTS. In this case, a new packet can then be sent to B2 with communication continuing normally. This would prevent a waste of time and resources. However, if this change of channel quality is not the case, then the MS would check to see if the NDE=0 is more reliable than the misread ACK (see 616, 618 from FIG. 7) from the scheduling BTS, which is not likely as the NDE is sent in a SAM that has a CRC check and the ACK/NACK channel does not have a CRC check. In this case, the packet would be resent. Similarly, a received signal strength level (e.g. RSSI) can be used to determine if a signal from one BTS is stronger (i.e. ACK more reliable) than another BTS, wherein the MS could switch 1230 to the stronger BTS as scheduler and continue with sending new packets. Further, uplink power control commands can be used in the same way, wherein a BTS that is signaling for an ever increasing power control bit would imply that it is losing the signal and is less reliable, indicating that the MS could switch 1230 to B2 and continue with sending new packets.

Referring back to FIGS. 11 and 12, the example considers the case where the non-scheduling ACK is not more reliable than the scheduling ACK, and the scheduling ACK conflicts with the NDE=0. This calls for a retransmit. Therefore, in the fourth row, the NDI bit is not flipped, and old data is sent 1204 with the same NDI bit, which is now properly received 1206 by BTS1 and properly read 1210 by the MS. In this case, the non-scheduling BTS (B2) previously received the packet correctly and can take notice that the NDI bit from the MS indicates that the same packet is being sent. Upon this notice, the B2 can ignore the packet and attend to other communication in discontinuous transmit (DTX) mode, or the B2 can re-ACK since it has already received the packet. In this way, the present invention provides a solution to the wasted resources and throughput and lost data that can presently occur when a MS misreads a BTS NACK as an ACK in soft handoff.

In a further embodiment of the present invention, if an MS receives an ACK/NACK indication but no new scheduling assignment message (SAM) from either the last scheduling BTS or new BTS (i.e. no NDE received), the MS can flush the data packet from its buffer if a first timer expires. T1 can be configured by the scheduler at set-up. However, if an MS Mobile receives a SAM from a new BTS (but not last scheduling BTS) and timer T1 has not expired, it can choose another HARQ channel to send new packets. These actions would depend on what the new BTS sent in terms of ACK/NACK for the last transmission, and if any and what the NDE is set to. One value for the NDE bits could be "1st transmission" used when the BTS has not previously sent any ACK/NACK and new data is expected for this assignment. In addition, a second timer, T2, could also be configured by scheduler such that if timer T2 expires following a last transmission (or ACK/NACK reception), the mobile reverts to an autonomous mode and sends a retransmission if the last transmission was determined to be a NACK. Lack of reception of a SAM for T1 duration can also be used in a determination process (e.g. scheduler may not schedule based on QoS considerations) and subsequent flushing of data from the MS data buffer.

Note that the NDE indicator is not the same as sending the ACK/NACK bit twice, i.e. once on the ACK/NACK channel and again later on the SAM channel where it is called the NDE bit. This relieves non-scheduling BTSs from having to send the SAM channel if only the NDE (truly the ACK/NACK bit in this case) is sent and not both an ACK/NACK and NDE. That is, if the non-scheduling BTSs did not send the SAM with the NDE and did not send the ACK/NACK then there would be no macro-selection diversity benefit possible. Also, there are significant benefits for having a separate ACK/NACK and SAM channel as discussed earlier which are independent of whether a NDE exists or not. There are additional reliability benefits by having both a NDE and an ACK/NACK which have also been discussed above.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for ACK/NACK determination reliability for a communication device, the method comprising:

defining a New Data Expected (NDE) indicator that indicates whether a base station (BTS) is expecting new data;

sending data from the communication device to the BTS on an uplinik channel, the data including a new data indication (NDI) of whether new data is being sent;

checking if the data was properly received using an ACK/NACK information;

receiving the NDE at the communication device in addition to the ACK/NACK information; and utilizing the NDE to determine a reliability of the ACK/NACK information.

2. The method of claim 1, wherein the ACK/NACK information of the receiving step is coded into a scheduling assignment message (SAM) from the a BTS downlinik ACK/NACK code channel.

3. The method of claim 1, wherein if a NACK is received in the checking step and the NDE indicates that new data is expected, further comprising:

sending an indication of new data along with a new packet of data.

4. The method of claim 1, wherein if an ACK is received in the checking step and the NDE indicates that new data is not expected, further comprising:

sending an indication of previous data along with resending the data.

5. The method of claim 1, further comprising:

operating the communication device in soft handoff, and wherein the receiving step includes receiving the NDE and ACK/NACK information from a first base station assigned as a scheduling base station and ACK/NACK information from a second base station assigned as a non-scheduling base station to the communication device, and wherein if the utilizing indicates a conflict between a received ACK and the NDE from the first base station, and an ACK is received from the second base station, then the receiving step includes measuring relative levels of a quality of signal (QoS) of the first base station and the second base station for inclusion in the utilizing to determine reliability of the ACK/NACK information, and wherein if the relative levels of the QoS between the first base station and the second base station has changed indicating that the second base station now has a better QoS than the first base station further comprising:

assigning the second base station as a scheduling base station, and sending new packet data to the second base station.

6. The method of claim 1, wherein upon a reliable NACK determination in the utilizing step, further comprising:

waiting a first predetermined time period for a subsequent SAM from the BTS, and flushing the data from a buffer of the communication device if the subsequent SAM is not received before the first predetermined time period expires.

7. The method of claim 1, wherein upon a reliable NACK determination in the utilizing step, further comprising:

waiting a second predetermined time period for a subsequent SAM from the BTS, and resending the data from a buffer of the communication device if the subsequent SAM is not received before the second predetermined time period expires.

8. A method for ACK/NACK determination reliability for a communication device, the method comprising:

defining a New Data Expected (NDE) indicator that indicates whether a base station (BTS) is expecting new data;

sending data from the communication device to the BTS on an uplinik channel, the data including a new data indication (NDI) of whether new data is being sent;

checking if the data was properly received using an ACK/NACK information;

receiving the NDE at the communication device in addition to the ACK/NACK information; and utilizing the NDE to determine a reliability of the ACK/NACK information such that if a NACK is received in the checking step and the NDE indicates that new data is expected, sending an indication of new data along with a new packet of data, and if an ACK is received in the checking step and the NDE indicates that new data is not expected, sending an indication of previous data along with resending the data.

9. The method of claim 8, further comprising:

operating the communication device in soft handoff, and wherein the receiving step includes receiving the NDE and ACK/NACK information from a first base station assigned as a scheduling base station and ACK/NACK information from a second base station assigned as a non-scheduling base station at the communication device, and wherein if the utilizing step indicates a conflict between a received ACK and the NDE from the first base station, and an ACK is received from the second base station, then the receiving step includes measuring relative levels of a quality of signal (QoS) of the first base station and the second base station for inclusion in the utilizing step to determine reliability, and wherein if the relative levels of the QoS between the first base station and the second base station has changed indicating that the second base station now has a better QoS than the first base station further comprising:

assigning the second base station as a scheduling base station, and sending new packet data to the second base station.

* * * * *